United States Patent [19]

Davis et al.

[11] Patent Number: 4,934,968

[45] Date of Patent: Jun. 19, 1990

[54] NICKEL PLATED CONTACT SURFACE HAVING PREFERRED CRYSTALLOGRAPHIC ORIENTATION

[75] Inventors: Thomas F. Davis, Camp Hill; David Kahn, Harrisburg, both of Pa.

[73] Assignee: AMP Incorporated, Harrisburg, Pa.

[21] Appl. No.: 331,707

[22] Filed: Mar. 31, 1989

Related U.S. Application Data

[63] Continuation-in-part of Ser. No. 945,433, Dec. 22, 1986, abandoned.

[51] Int. Cl.[5] .............................................. B32B 15/00

[52] U.S. Cl. .................................... 439/886; 439/851; 428/680; 428/929; 428/935

[58] Field of Search ............... 200/267, 266, 268, 269; 204/49; 428/680, 935, 929, 931; 439/887, 886, 851

[56] References Cited

U.S. PATENT DOCUMENTS

| | | | |
|---|---|---|---|
| 1,615,662 | 1/1927 | Tuttle | 310/239 |
| 1,774,446 | 8/1930 | Maartens | 200/263 |
| 2,379,641 | 7/1945 | Keitel | 200/263 |
| 2,802,923 | 8/1957 | Weijer et al. | 200/267 |
| 3,175,181 | 3/1965 | Grabbe | 439/886 |
| 3,707,696 | 12/1972 | Carter | 339/17 F |
| 3,780,433 | 12/1973 | Lynch | 439/83 |
| 3,993,381 | 11/1976 | Horbach | 439/886 |
| 4,168,878 | 9/1979 | Risser et al. | 439/886 |
| 4,447,109 | 5/1984 | Hobart | 439/886 |
| 4,564,565 | 1/1986 | Gamblin | 428/680 |
| 4,610,932 | 9/1986 | Haynes et al. | 428/611 |
| 4,685,761 | 8/1987 | Locati | 439/886 |

FOREIGN PATENT DOCUMENTS

86/07205 12/1986 World Int. Prop. O. .

OTHER PUBLICATIONS

J. K. Dennis and T. E. Such, *Nickel and Chromium Plating*, pp. 49–55, John Wiley & Sons, New York, 1972.
Amblard et al., *Journal of Applied Electrochemistry*, pp. 233–243 (1979).
S. H. Kulpa and R. P. Frankenthal, *J. J. Electrochem. Soc.*, 124 (1977), p. 1588.
Chemical Abstracts, vol. 77, No. 12, 9/18/72, p. 568, "Effect of the Adsorption of Halide Ions on the Change in the Texture of Electrodeposited Nickel".
J. Electrochem. Soc., vol. 125, No. 12, 12/1978, pp. 1940–1945, "The Effect of Depassivation at Specific Crystal Facets on the State of Activation of Nickel Substrates for Electrodeposition".
"Properties of Electroplated Nickel Alloy Films for Contacts", Robbins et al., *Plating and Surface Finishing*, Mar. 1987.
Harry Searles, Plating, vol. 53, No. 2, pp. 204–208 (1966).
Richard M. Bozorth, Physical Reviews, 2nd Series, vol. 26, pp. 390–396 (1925).
E. M. Wise, "Electrical Contacts", Int'l. Nickel Co., pp. 69–71, May 30, 1945.
J. K. Dennis et al., "Nickel and Chromium Plating", pp. 43–47 (1972).
Jean Amblard et al., J. Microsc. Speectrosc. Electron., vol. 6, No. 3, pp. 311–322 (1981).
M. R. Pinne Pinnel et al., *J. Electrochem. Soc.*, 126 (6) (1979), p. 1274.

*Primary Examiner*—John J. Zimmerman
*Attorney, Agent, or Firm*—Katherine A. Nelson

[57] ABSTRACT

Electrical contact device such as a terminal or a contact surface, has electrodeposited nickel thereon. The crystallites of the nickel are preferentially oriented with at least 50 percent of the volume {100} atomic planes substantially parallel to the contact surface. For many purposes, the preferentially oriented nickel surface is comparable to a gold plated contact surface.

8 Claims, 5 Drawing Sheets

NICKEL PLATED CONTACT SURFACE HAVING PREFERRED CRYSTALLOGRAPHIC ORIENTATION

CROSS REFERENCE TO OTHER APPLICATION

This application is a continuation-in-part of application Ser. No. 945,433 filed Dec. 22, 1986 now abandoned.

FIELD OF THE INVENTION

This invention relates to nickel platings for electrical contact devices such as electrical contact terminals of the type used in disengageable electrical connectors.

BACKGROUND OF THE INVENTION

Electrical terminals or other devices having contact surfaces are frequently electroplated with a metal which has superior contact properties as compared to the basis metal, for example, it is common to plate copper terminals with nickel and with a thin gold plating over the nickel to function as the contact surfaces. Tin is also frequently used as a plating for terminals or other contact devices.

The ideal, and nearly perfect, contact surface is electroplated gold but other metals, particularly tin, are frequently used because of the very high cost of gold. Electroplated nickel has been used on terminals and other contact devices to a limited extent as a contact surface (rather than as an underplating for gold) but its use has been very limited for the reason that when a nickel surface is exposed to the atmosphere, it develops a strong insulating oxide film which must be broken when the contact device is placed in service as happens when the contact device is crimped onto a wire or brought into engagement with a complementary contact device. A tin plating will also develop an oxide film but the tin oxide is easily broken by a relatively low contact force when the device is placed in service for the reason that the underlying metallic tin is relatively soft and the hard tin oxide on the surface is fractured under a relatively low contact force. Nickel, however, is relatively hard and it is relatively difficult to break the insulating film when a nickel plated terminal is placed in service.

Nickel has been used in the past on contact surfaces where the normal force (the contact force exerted on the contact surface) is 500 grams or greater but has not been considered suitable for contact surfaces when the normal force is much below 500 grams. Many electrical terminals are designed to produce a normal force of about 100 grams and a higher normal force is not practical because of the small size of the terminals and the limitations of the metal from which the terminals are manufactured. For example, many of the commonly used types of connecting devices for integrated circuit chip carriers contain contact terminals which, because of size limitations, exert a normal force in the 100 to 200 gram range and it is generally regarded as necessary to use a gold contact surface on such terminals notwithstanding the added cost.

The foregoing comments apply to nickel platings produced by conventional plating techniques which will ordinarily have a relatively random orientation of the crystallites in the plating.

We have found that if a electroplated nickel surface on a terminal device has a particular grain orientation, the development of the oxide film on the nickel surface will take place only to a limited extent, and as a result, a stable low resistance electrical connection will be obtained when the plated device is placed in service. Specifically, if the electroplated surface has about 50 percent of the volume fraction of the crystallites therein preferentially oriented so that their {100} atomic planes are substantially parallel to the contact surface itself, the characteristics of the connection will be outstanding and for many purposes will be comparable to a gold plated contact.

THE INVENTION

The invention comprises an electrical contact terminal having contact surface portions which are engageable with complementary contact surface portions The terminal is characterized in that the contact surface portions are of electrodeposited nickel and comprise nickel crystallites. At least 50 percent of the volume fraction of the crystallites are preferentially oriented with their {100} atomic planes substantially parallel to the contact surface portions as determined by X-ray diffraction orientation analysis.

In accordance with specific embodiments of the invention, the terminal may be of the type which is intended to be disengageably coupled to a complementary contact terminal with the contact surface portions being slidable against complementary contact surface portions of the complementary contact terminal. The terminal and the complementary contact terminal may for example, be a contact pin and a contact socket. Both of the terminals may have electroplated nickel on their contact surfaces preferentially oriented as explained above.

THE DRAWING FIGURES

THE DISCLOSED EMBODIMENT

Figure 1:
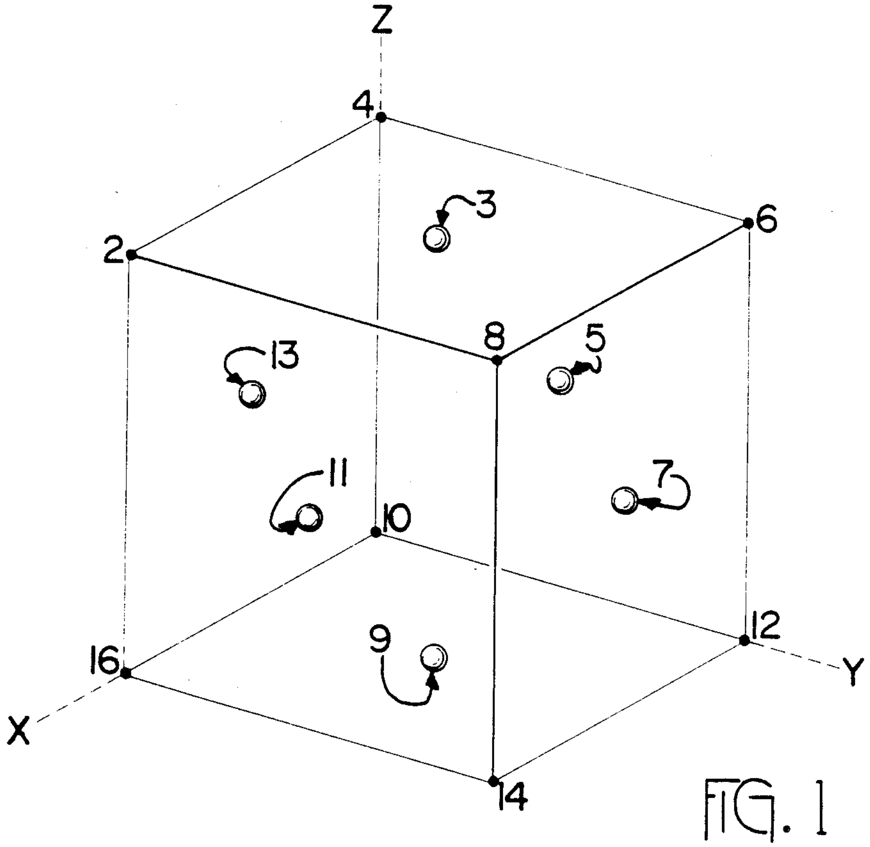
FIG. 1 shows a face centered cubic lattice.

Electrodeposited platings, like virtually all metals used commercially, are composed of a multitude of individual grains or crystallites. Each crystallite constitutes a domain in which all of the atoms of the metal are arranged in precisely predetermined positions relative to each other in a specific crystallographic habit or form. FIG. 1 shows an individual lattice having atoms in the face centered cubic habit which is the crystallographic habit of electrodeposited nickel. An individual crystallite is composed of a multitude of cubic lattices of the type shown in FIG. 1, with all of the lattices in the same crystallite being in the same orientation and with the individual atoms shown in FIG. 1 being shared with additional lattices. Adjacent crystallites will usually not be in the same orientation but will be displaced in one way or another from their neighbors so that the lattices in two additional crystallites will be in different orientations.

The orientation of a crystallite is determined with reference to the positions of the atoms relative to the XYZ axes shown in FIG. 1. The face centered cubic lattice shown in FIG. 1 has eight corner atoms indicated by the reference numerals 2, 4, 6, 8, 10, 12, 14, 16, which define the cube. It also has an atom on each of its eight faces which are indicated by the reference numerals 3, 5, 7, 9, 11, and 13. The corner atoms 2, 4, *14, 16, are shared by seven adjacent lattices in the crystallite and each of the facial atoms 3, 5, *11, 13 is shared with one adjacent lattice.

Crystallographers refer to the various crystallographic planes of a lattice of the type shown in FIG. 1, which planes are defined by different groups of atoms in the lattice. The planes are identified by the locations of their intersections with the XYZ axes. For example, the plane which contains the atoms 2, 4, 6, 8, and 3 is referred to as the (001) plane for the reason that it intersects the Z axis and is parallel to the X axis and the Y axis. Similarly, the plane containing the atoms 6, 8, 12, 14, and 7 is referred to as the (010) plane, while the plane containing the atoms 2, 8, 14, 16, and 11 is referred to as the (100) plane.

It will be noted that all of the planes on the surfaces of the lattice are composed of four atoms which are equidistant from each other, to form a square, and a centrally located atom, for example, the (001) plane is composed of the atoms 2, 4, 6, 8, and the central atom 3. Since all of these planes which form the faces of the lattice are identical to each other with respect to the locations of the atoms therein, they are collectively referred to as the {100} planes, with the distinctive brackets indicated rather than parentheses which are used to identify specific planes.

Other crystallographic planes in the lattice shown in FIG. 1 would have different indices. For example, the (111) plane would contain (i.e., intersect) the atoms 4, 13, 16, 9, 12 and 6, since this plane intersects each of the three axes at a unit distance from the origin which is occupied by the atom 10.

In accordance with the present invention, about 50 volume percent of the individual crystallites in the plating have their {100} planes parallel to the contact surface and the remaining 50 percent of the crystallites may be more or less randomly oriented with any other planes parallel to the contact surface. As will be explained below, it has been determined that good results are achieved if 50 volume percent or more of the crystallites are preferentially oriented and such preferential orientation can be achieved by carrying out the electroplating operation as also explained below.

Figure 6:
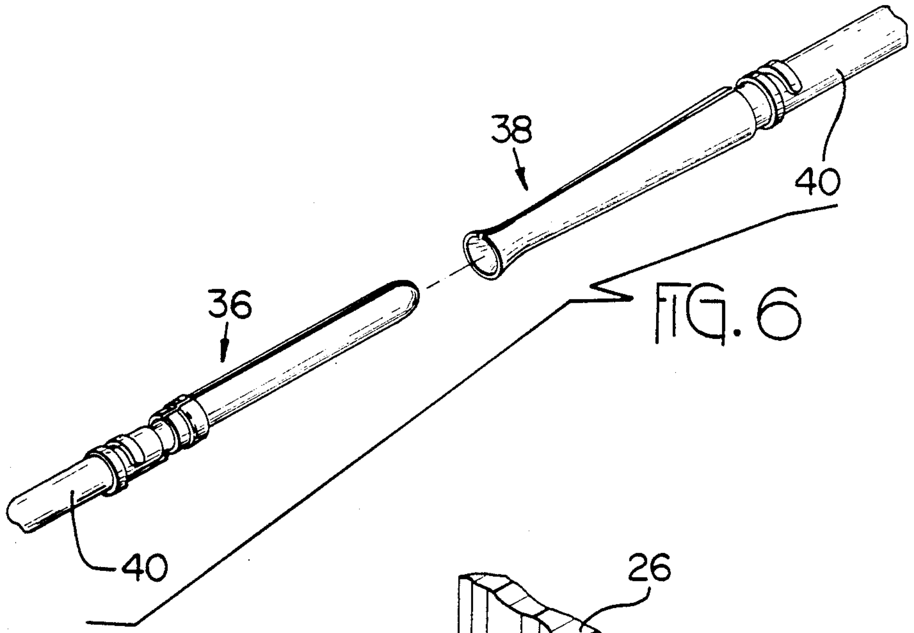
FIG. 6 is a perspective view showing a terminal pin and a terminal socket.
Figure 5:
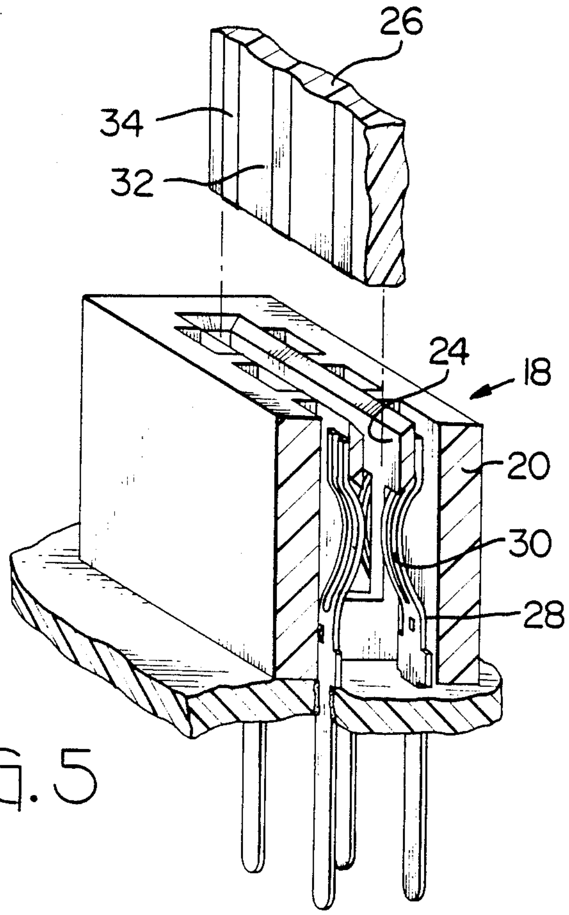
FIG. 5 is a cross-sectional view of a circuit board connector of a type with which the present invention can be used.

FIGS. 5 and 6 show typical terminals on which platings in accordance with the invention can be used. FIG. 5 shows a connector 18 for a circuit board 26. The connector 18 comprises a housing 20 having a troughlike opening 24 which receives the lower edge of the circuit board. The housing contains terminals 28 which are arranged in two rows as shown so that the contact portions 30 of the terminals will contact the contact pads 34 on the side surfaces 32 of the circuit board. These contact pads and the contact portions 30 of the terminals can be plated with oriented nickel in accordance with the invention.

FIG. 6 shows a contact pin 36 and a socket 38, the pin and socket being crimped onto wires 40. The surface of the pin and the internal surface of the socket can be plated with oriented nickel for improved contact characteristics.

Electroplated contact surfaces in accordance with the invention can be produced from a plating system having a bath of the following composition:

| | |
|---|---|
| Nickel (added as nickel sulphamate) | 75 gm/liter |
| Nickel bromide | 10 gm/liter |
| Boric acid | 20 gm/liter |

Good results are obtained with this bath composition and under varying conditions of bath temperature, current density, and bath pH. The following table sets forth specific operating conditions which have been tested and which have produced oriented nickel platings in accordance with the invention.

| Bath No. | Current Density AMPS/square ft. | pH | Bath Temp. °C. |
|---|---|---|---|
| 1 | 15 | 3.5 | 30 |
| 2 | 30 | 3.5 | 45 |
| 3 | 30 | 3.5 | 60 |
| 4 | 30 | 5.5 | 30 |
| 5 | 30 | 5.5 | 45 |

It cannot be assumed that the sulphamate bath discussed above will yield good results under all operating conditions. For example, it was found that when the bath temperature of bath #5 was raised from 45° C. to 60° C., the volume percentage of crystallites having the desired orientation decreased and the volume percentage having a preferred {111} orientation increased to the extent that the volume percentage of crystallites having a preferred {111} orientation was greater than that of the crystallites having a preferred {100} orientation.

Another widely used type of plating bath for nickel contains nickel sulfate with boric acid. A typical bath of this type has the following composition:

| | |
|---|---|
| Nickel sulfate | 300 grams/liter |
| Boric acid | 40 grams/liter |

Sulfate baths of this type will, under many operating conditions, produce a plating having a preferred {111} orientation plating. However, a preferred {100}plating in accordance with the invention can be obtained with a sulfate bath if the plating conditions regarding pH, bath temperature, and current density are within certain limits. For example, a preferred {100} orientation plating has been obtained using a sulfate bath when the pH was 3.5, the current density was 10 amps/sq. ft., and the bath temperature was 60° C.

To summarize, there are many plating baths which are capable of producing platings having the preferred {100} orientation of the present invention. However, the parameters of the plating process (precise bath composition, temperature, pH, and current density) must be carefully selected to produce the desired result.

Electrodeposited nickel platings in accordance with the invention can be inspected by means of well known X-ray diffraction techniques. A plating line for the practice of the invention can be established by using one of the preferred baths discussed above and setting the plating conditions within the plating parameters which will produce the desired {100} orientation in the crystallites. The plated product can be inspected at the time of initial start-up for the desired orientation. After it has been determined that the desired orientation is being achieved, it is thereafter only necessary to carefully maintain the plating conditions.

Techniques for obtaining diffraction patterns are well known and need not be described in detail, for example, see Cullity, *Elements of X-Ray Diffraction,* second edition, Addison-Wesley, New York, N.Y., (1978). A suitable apparatus for obtaining diffraction patterns is a Siemens Kristalloflex 4 X-Ray generator and a Type F diffractometer with a diffracted beam monochromotor.

The orientation of the nickel platings is observed by measuring the areas of the individual peaks in the powder diffraction pattern. Since the diffractometer uses the Bragg Brentano geometry, diffraction occurs from crystallites whose atomic planes are essentially parallel to the plating surface The relative peak areas (which are proportional to the volume fraction of crystallites corresponding to this orientation) for a random distribution of nickel crystallites have been published by the JCPDS-International Centre for Diffraction Data. If, for example, the nickel crystallites in the plating are oriented so that crystallites with {100} planes parallel to the plating surface are preferred; the relative area under the 200 peak (the 100 peak has zero intensity for a face centered cubic symmetry) will be correspondingly larger than it would be for a random orientation. A simple orientation parameter may be constructed by dividing the area of the peak in question by the total area of all the observed peaks in the pattern, and normalizing this number by dividing by a similar ratio obtained from the random orientations listed in the JCPDS file.

It is not necessary in the practice of the invention to have all of the crystallites preferentially oriented and, as noted above, the results of the invention will be achieved if 50 percent by volume of the crystallites have their {100} planes parallel to the contact surface. This seemingly low requirement of preferentially oriented crystallites can be understood in the light of contact theory as explained below.

When two contact surfaces are against each other, they are not in physical contact throughout but are in actual contact only at a limited number of locations where projecting asperities on the two surfaces are against each other. When a current passes from one surface to the other, it passes only through these actual sub-microscopic locations of actual contact and the remaining portions of the contact surfaces are not effective from a current carrying standpoint.

In the case of nickel plated contact surfaces in accordance with the present invention, it must be remembered that the crystallites are quite small and the crystallites which have the preferred {100} orientation will be randomly distributed on both surfaces. When the two surfaces are brought into engagement with each other, it is a virtual statistical certainty that a sufficient number of preferentially oriented crystallites on the one surface will be against preferentially oriented crystallites on the other surface to ensure good contact. Good results can be obtained with a lesser number of preferentially oriented crystallites but the 50 percent specification is easily achieved in plating practice and has demonstrably given uniformly good results without the possibility of occasional random failures as a result of lack of contact between preferentially oriented crystallites.

Following is a discussion of some of the theoretical aspects of the invention and an explanation of the improved results obtained. This discussion is based on experimental observations and deductions, which are also described below. Applicants do not intend to be bound by the discussion presented, which might be modified in the light of future evidence, and it is presented here in the interest of completeness.

The oxide which normally forms on an electrodeposited nickel surface has a thickness of about 20 AU (Angstrom units). However, the {100} planes of nickel crystallites appear to resist the formation of an oxide; the oxide formed on the surfaces of the {100} planes reaches a thickness of only about 3AU and stabilizes at that thickness. It seems probable that the extremely thin oxide which forms on the {100} planes does not present an effective barrier to the passage of an electrical current and for practical purposes the surface can be considered free of oxide or nearly so.

We have measured the contact resistance on several of the crystallographic planes of nickel single crystals under carefully controlled conditions. Our data support the conclusion that superior contact characteristics are obtained on the {100} planes as a result of the presence of only an extremely thin oxide coating on the {100} planes as compared to other crystallographic planes of the nickel lattice.

Figure 2:
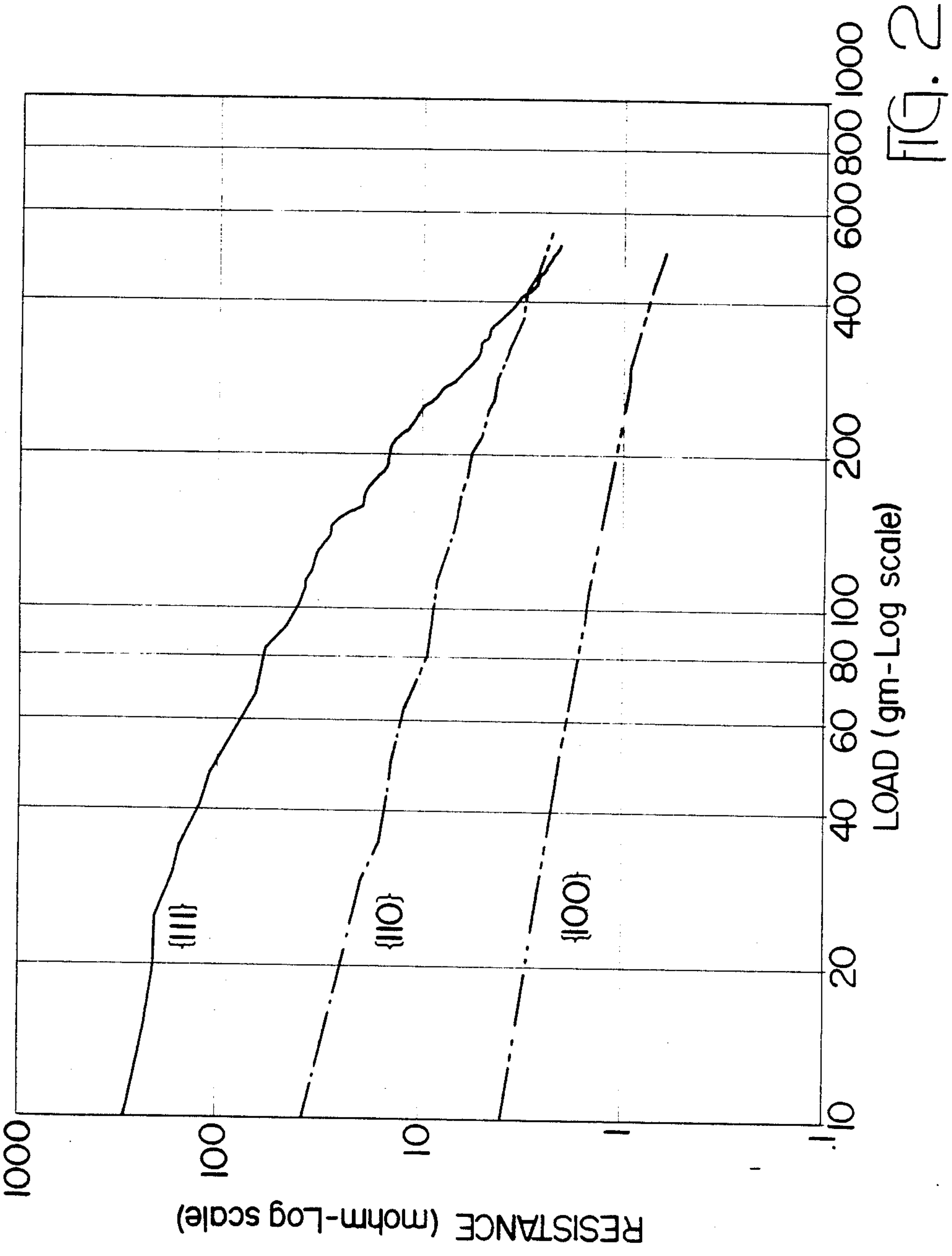
FIGS. 2–4 are curves which explain the improved results achieved in the practice of the invention.

The results of the measurements referred to above are presented in FIG. 2 which shows the resistance vs. load contact force characteristics for three of the crystallographic planes of nickel single crystals. The data for these curves were obtained by preparing single crystals of nickel in a manner such that the {100} plane was exposed on one specimen, the {111} plane was exposed on another specimen, and the {110} plane was exposed on the third specimen The contact resistance of each specimen was determined by contacting the surface with a gold test probe under varying and increasing load conditions ranging from 10 grams to 500 grams. The test current was 49 milliamperes and the voltage was 50 millivolts. The data obtained were then plotted on logarithmic scales, the resistance being indicated by the vertical axis and the test probe load by the horizontal axis.

The following table is based on FIG. 2 and compares the contact resistance of the three specimens under selected contact force conditions.

| Load | {100} | {110} Resistance | {111} |
|---|---|---|---|
| 10 gm. | 4 milliohms | 37 milliohms | 300 milliohms |
| 100 | 1.5 | 8.2 | 40 |
| 400 | 0.7 | 3.0 | 3.1 |

It is apparent from FIG. 2 and from the table that the contact resistance of the {100} plane is extremely low L as compared with the {111} and {110} planes. It is particularly noteworthy that with a contact force of 100 grams, the {100} plane has a contact resistance of only about 1.5 milliohms while the {110} and {111} planes have contact resistances of about 8.2 and 40 milliohms respectively. As mentioned previously, many of the terminals used in microelectronics applications are limited to a contact force of 100 grams because of size and material limitations.

Numerous tests have been carried out for the purpose of comparing terminals plated in accordance with the invention with terminals having grain orientations which did not satisfy the requirements of the invention. In these tests, terminals of the type shown at 28 in FIG. 5 were used. The results of these tests are summarized below.

Samples of nickel plated terminals have been tested to compare and evaluate two nickel plating variations. One set of samples was prepared using a nickel sulfamate bath. The plating parameters were adjusted to produce a predominantly {100} oriented nickel plating as discussed above. A second set of connector samples was prepared using a sulfate nickel bath. The parameters of this bath were adjusted to produce a predominantly {111} oriented nickel plating. These two nickel plating variations were subjected to a number of environments and were compared to each other and to a similar set of connectors plated with a standard gold plating.

Figure 3:
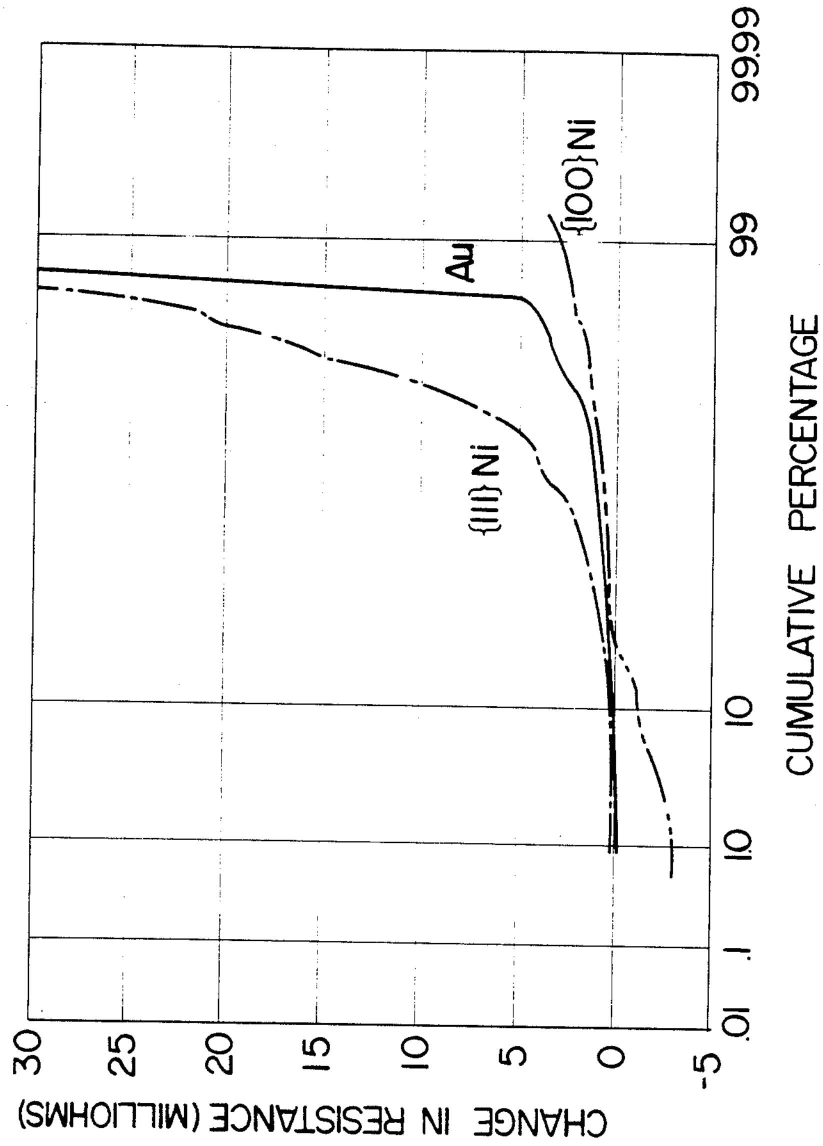

FIG. 3 shows the effect of a 103 day heat age test on the three plating types. In this test the prepared connectors were heat soaked in an oven for 103 days at a temperature of 105 C with resistance monitoring at room temperature. The plot of resistance change vs. cumulative percentage shows that all 99 samples of the terminals plated with predominantly {100} oriented nickel showed a resistance change after the test that was less than 3.21 milliohms. The {111} plated terminals, on the other hand, had numerous terminals that showed a resistance change greater than the failure criterion of 6.50 milliohms.

Figure 4:
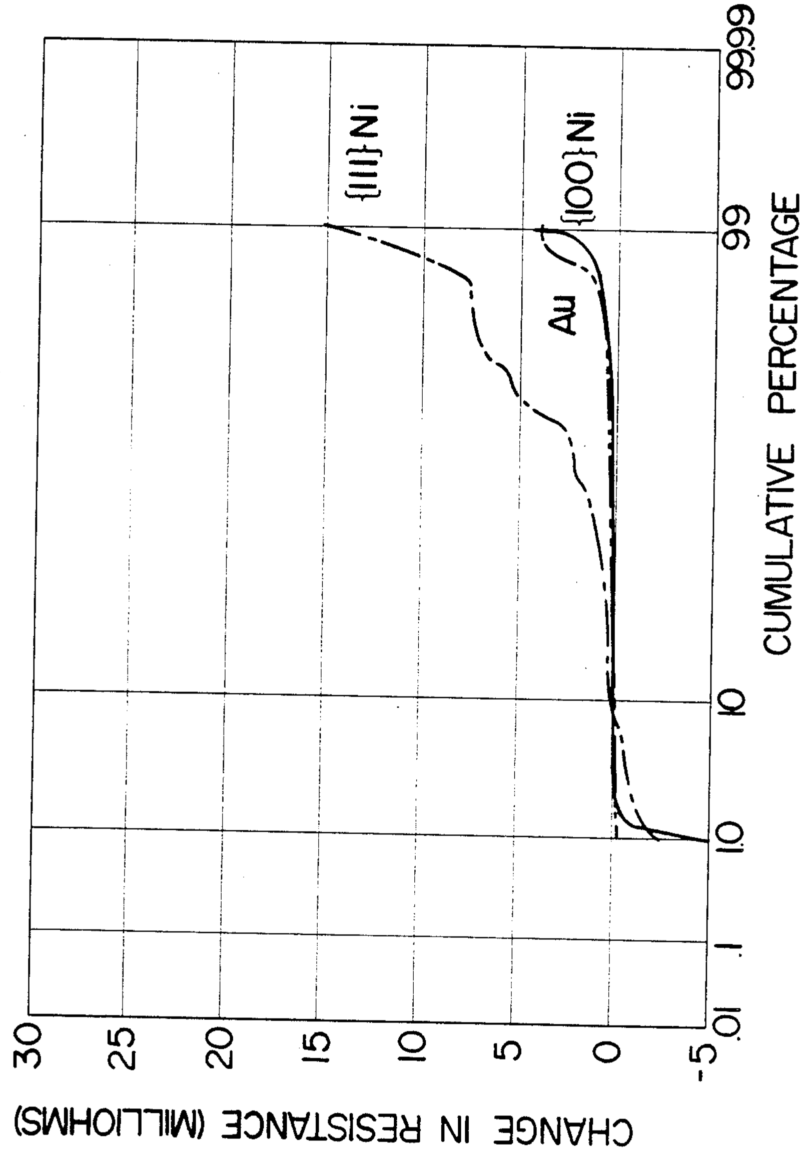

FIG. 4 shows the results of a test of the two types of plating after 20 days of exposure to an Industrial Mixed Flowing Gas environment (AMP Test Specification 109-85, Rev. 0). This environment includes pollutant gas concentrations of 100±20 ppb $H_2S$, 200±50 ppb $NO_2$, and 20±5 ppb $Cl_2$. The temperature was maintained at 30 C and the relative humidity was 75 percent. Before the test, all connector samples were subjected to a shelf life simulation exposure of:

64 hours at 85%, RH (Relative Humidity), 85° C.
24 hours at dry, 85° C.
24 hours at 85% RH, 85° C.
32 hours at dry, 85° C.
24 hours at 85% RH, 85° C.
64 hours at ambient As FIG. 4 shows, the {100} oriented nickel plated terminals showed very little change in contact resistance, whereas eight samples of the {111} oriented nickel plated connectors showed a resistance change larger than the 6.50 milliohm failure criterion. In all tests where there was a significant difference between the two platings, the {111} oriented samples were inferior to the {100} oriented samples.

We claim:

1. An electrical contact terminal having contact surface portions which are engageable with complementary contact surface portions, the terminal being characterized in that:

the contact surface portions are of electrodeposited nickel and comprise nickel crystallites, at least 50 percent of the volume fraction of the crystallites being preferentially oriented with their {100} atomic planes substantially parallel to the contact surface portions as determined by X-ray diffraction orientation analysis.

2. An electrical contact terminal as set forth in claim 1, characterized in that the terminal is intended to be disengageably coupled to a complementary contact terminal, the contact surface portions being slidable against complementary contact surface portions on the complementary contact terminal when the terminal is coupled to the complementary contact terminal.

3. An electrical contact terminal as set forth in claim 2, characterized in that the terminal is a contact pin, the complementary terminal being a contact socket, the complementary contact surface portions having electrodeposited nickel thereon, the electrodeposited nickel on the complementary contact surface portions also having at least 50 percent of the volume fraction of the crystallites thereof preferentially oriented with their {100} atomic planes substantially parallel to the complementary contact surface portions as determined by X-ray diffraction orientation analysis.

4. An electrical connection between contact surface portions of an electrical terminal and complementary contact surface portions of a complementary electrical device having a normal contact force, the electrical connection being characterized in that:

the contact surface portions of the terminal are of electrodeposited nickel and comprise nickel crystallites, at least 50 percent of the volume fraction of the crystallites being preferentially oriented with their {100} atomic planes substantially parallel to the contact surface portions of the terminal as determined by X-ray diffraction orientation analysis.

5. An electrical connection as set forth in claim 4, characterized in that the complementary contact surface portions are also of said electrodeposited nickel as recited in claim 8.

6. An electrical connection as set forth in claim 5, characterized in that the terminal is a contact pin and the complementary contact surface portions are on a contact socket.

7. An electrical connection as set forth in claim 4 characterized in that the normal contact force of the electrical connection is not greater than about 200 grams.

8. An electrical connection as set forth in claim 5 characterized in that the normal contact force of the electrical connection is not greater than about 200 grams.

* * * * *